Figure 1:
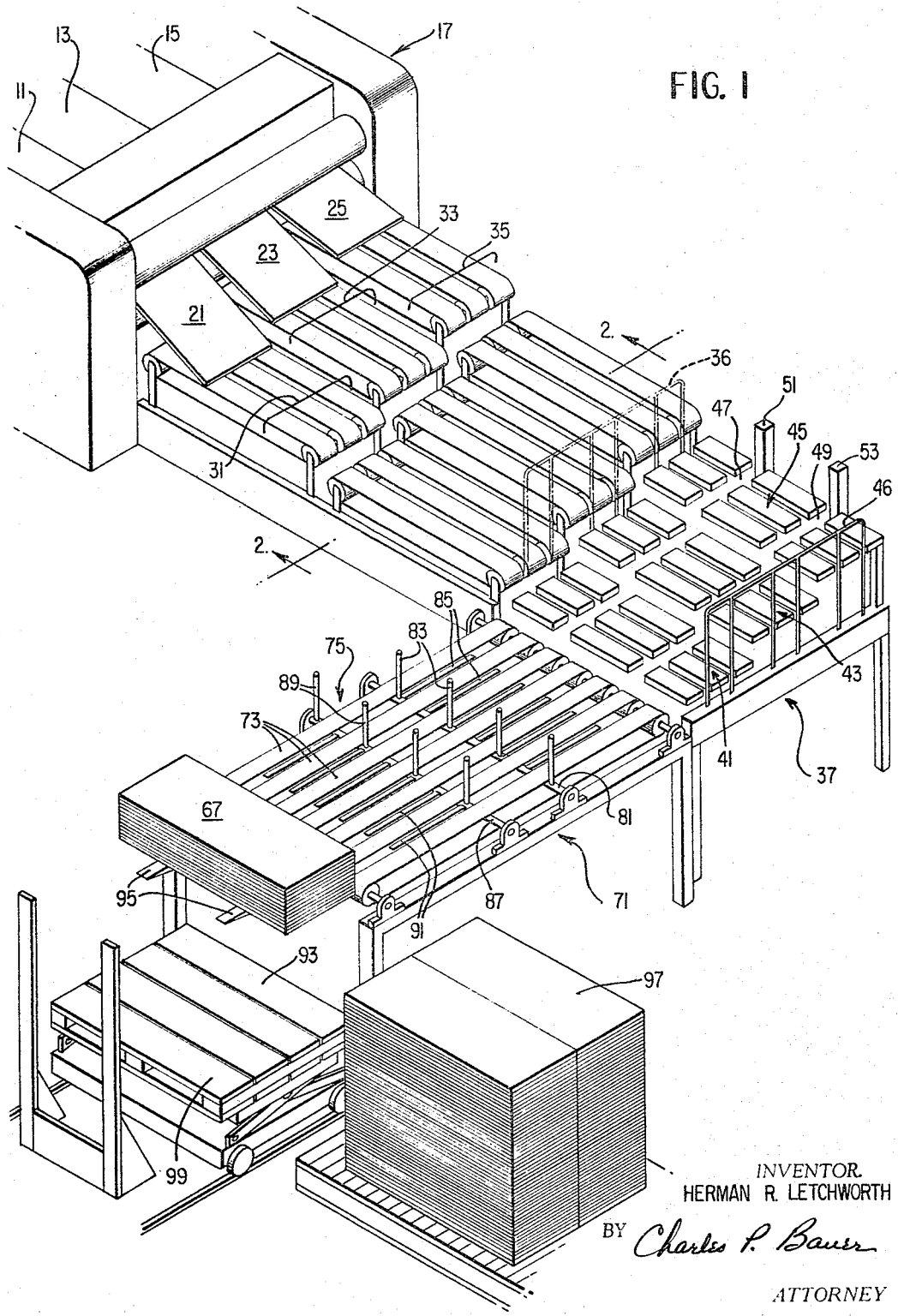

Jan. 10, 1967     H. R. LETCHWORTH     3,297,174
APPARATUS FOR STACKING SHEET MATERIAL
Filed March 24, 1964     2 Sheets-Sheet 1

INVENTOR.
HERMAN R. LETCHWORTH
BY Charles P. Bauer
ATTORNEY

Jan. 10, 1967  H. R. LETCHWORTH  3,297,174
APPARATUS FOR STACKING SHEET MATERIAL
Filed March 24, 1964  2 Sheets-Sheet 2

INVENTOR.
HERMAN R. LETCHWORTH
BY Charles P. Bauer
ATTORNEY

United States Patent Office 3,297,174
Patented Jan. 10, 1967

3,297,174
APPARATUS FOR STACKING SHEET MATERIAL
Herman R. Letchworth, Savannah, Ga., assignor to Union
Camp Corporation, a corporation of Virginia
Filed Mar. 24, 1964, Ser. No. 354,357
3 Claims. (Cl. 214—6)

This invention relates to apparatus for handling sheet or slab material, and more particularly, relates to a new and improved method and apparatus for conveying sheets or slabs from a cutting station to a stacking station without the sheets becoming "knitted" or drawn together, and for further conveying the stacked sheets to a collecting station with alternate turns of the stacked sheets to prevent warping.

Previously, the conveying and stacking of a cascade of cut sheets, particularly those of the lightweight corrugated type, has required several attendants to insure successful results. Typically, after a web is longitudinally cut into several parallel strips, and the strips are transversely cut into sheets, the sheets are run onto conveyor belts in a shingled pattern. During conveyance, the sheets tend to twist slightly from side to side and become misaligned. Due to the misalignment, the sheets overlap or cross each other and tend to rest somewhat bindingly on each other, i.e., become "knitted," and thus, foul the subsequent stacking operation. Consequently, to avoid this fouling several attendants are necessary to pull the knitted or interlocked sheets apart to be straightened and stacked off.

Another difficulty is that in the final collection of the stacks, a relatively large number of attendants is necessary to straighten the stacks, to overturn alternate stacks to prevent warping of the corrugated sheets when finally stacked, and to remove and stack the stacks from the conveyor to the material handling device.

These and other difficulties are overcome by the present invention in which there is provided a plurality of tiers of conveyor belts, one tier of belts for each strip, for receiving the sheets in shingled fashion from a cutter station. The shingled sheets are thus kept separate from each other because they are carried on respectively different tiers. The differently tiered sheets are carried to a similarly tiered stacking table which has transversely traveling push rods. The push rods push the highest tiered stack of sheets over the other tiered stacks of sheets forming one stack. This stack is carried in the direction of the push rod action to a turning device which turns alternate stacks to prevent warping when finally piled. The turned and unturned stacks are then carried to a piling station where a pile is formed and carried away.

Accordingly, it is an object of the present invention to provide an improved conveying and stacking arrangement wherein manual handling of the stacks in forming a pile thereof is essentially eliminated.

Another object of this invention is to provide an improved stacking arrangement wherein means are provided for overturning alternate stacks to prevent warping in the piling of stacked sheets.

Another object of this invention is the provision of an improved stacking arrangement wherein sticking or "knitting" of the conveyed sheets is prevented.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which:

FIG. 1 is a perspective view of an improved stacking arrangement according to the invention, and FIGS. 2–8 inclusive are diagrammatic views of the invention in different operational stages thereof.

Referring to FIG. 1, a web of corrugated material has been longitudinally cut into three strips 11, 13 and 15. These strips are fed to a remote controlled transverse cutter 17 of any suitable design where the strips are cut into sheets 21, 23 and 25. After cutting, the sheets 21, 23 and 25 are allowed to drop a small distance to three respective, vertically offset tiers of belts 31, 33 and 35, the sheet 21 engaging the tier 31, the sheet 23 engaging the tier 33, and so on. Although the drawing shows the tiers as made up of three belts each, it will be understood that each can be individually adjustable so that any number of belts may be raised or lowered to form the desired number of tiers and each tier may have the same number of belts or each tier may vary as to such number. The belts of the tiers 31, 33 and 35 are driven in unison by any suitable means, and the movement of the belts may be intermittent under any suitable control means. A stop gate 36 may be provided at the discharge end of the belts of tiers 31, 33 and 35.

Figure 2:
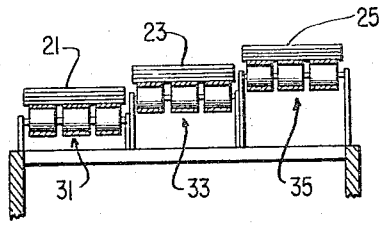

Thus, by means of controlled movement of the tiers of belts 31, 33 and 35, the sheets 21, 23 and 25 are disposed in shingled fashion thereon after they are cut. Inasmuch as partial stacking or shingling of sheets is well-known, the shingling operation need not be described in detail. The shingled sheets 21, 23 and 25 cannot overlap or become knitted together because of the fact that the sheets are positioned on different levels, each different level corresponding to one of the tiers 31, 33, 35. This tier arrangement is shown in the diagram of FIG. 2, which is a transverse cut of FIG. 1 at lines 2—2.

The longitudinal conveying action of the belt tiers 31, 33 and 35 moves the shingled array of the sheets 21, 23 and 25 to a stacking table 37. The stacking table 37 has three tiers of stacking stations 41, 43 and 45 corresponding in level, respectively to the belt tiers 31, 33 and 35. Here again the slats of these stacking stations can be individually adjustable so that any number of slats may be raised or lowered to form any number of stations with any number of slats. These stations will correspond to the belts and tiers which have been described above for tiers 31, 33 and 35. A partition or any suitable stop means 46 is located at an end of the stacking table 37 for stopping longitudinal movement of the sheets 21, 23 and 25.

Each tier 41, 43 and 45 of the stacking table 37 may be made of any suitable support means such as slats or planks. Each tier 41, 43 and 45 has a pair of slits 47 and 49 which are oriented transverse to the previous longitudinal motion of the sheets. A pair of bi-directional movable push bars 51 and 53, driven by any suitable controllable means (not shown), are disposed for motion at controlled times back and forth in the slits 47 and 49.

The belts of tiers 31, 33 and 35 push the sheets 21, 23 and 25 onto the respective stacking table tiers 41, 43 and 45 until the height of each resulting stack on one tier is equal to or less than the vertical offset between said one tier and the next higher tier. When the proper stack levels are reached, the stop gate 36 is activated, stopping movement of the sheets.

Figure 3:
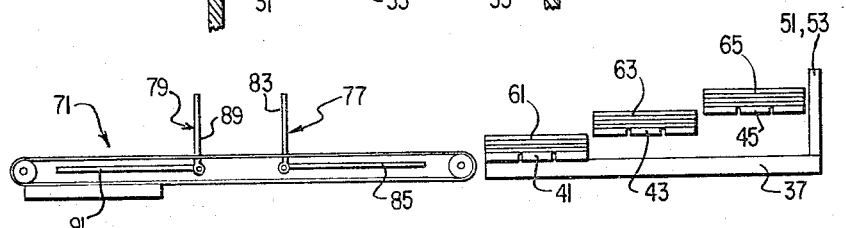
Figure 4:
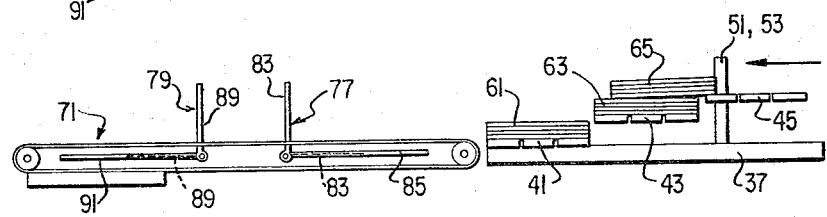

The sheets as stacked on each tier of the stacking table 37 are indicated by the numerals 61, 63 and 65, respectively, in FIGS. 3 and 4.

Figure 5:
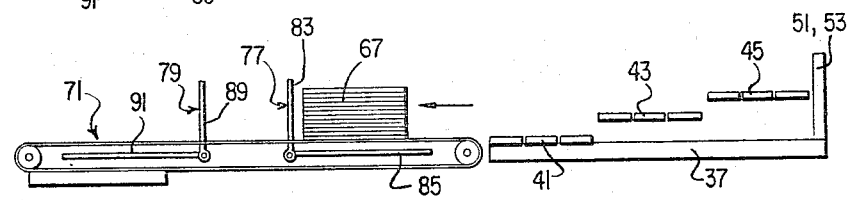

As shown in FIG. 4, the stacks 61, 63 and 65 are then pushed transversely together by the bars 51 and 53 so that stack 65 overlies stack 63, and stacks 65 and 63 together overlie stack 61. There is thus formed, as shown in FIG. 5, a larger stack 67 composed of stacks 61, 63 and 65 on the tier 41.

Located beyond the tier 41 and essentially coplanar therewith is a conveyor table 71 for receiving the stack 67 from the stacking table 37. The conveyor table 71 has an array of coplanar spaced belts 73 driven for controlled intermittent movement by any suitable driving means (not shown).

Also located on the conveyor table 71 is a stack turning device 75, employing two adjacently dispersed rotating support members 77 and 79, respectively. The members 77 and 79 are shown in their positions for turning over a stack.

The member 77 has a transverse shaft 81 underlying the conveying portion of the belts 73. The member 77 has pivotally mounted on its shaft 81 an array of upstanding pegs 83 and about 90 degrees therefrom an array of horizontal rods 85, rigidly fixed to the shaft 81, both arrays being interleavable with the spaced belts 73. The rods 85 when positioned for stack turnover extend toward the stacking table 37.

The member 79 has a transverse shaft 87 having pivotally mounted thereon upstanding pegs 89 and rigidly mounted thereon horizontal rods 91, said rods and pegs forming an approximate 90 degree angle with each other. With the support members 77 and 79 in stack-turning position, the rods 91 extend in a direction opposite the rods 85. The pegs 89 are disposed for interleaving relationship with the pegs 83.

Each of the shafts 81 and 87 are intermittently rotatably by means of any suitable driving means (not shown) on a signal from a suitable controlling device or from a remote control station. The shafts 81 and 87 are spaced from each other by an amount approximately equal to, or greater than, the length of the peg 83 or 89.

As shown in FIG. 4, when the support members 77 and 79 are not being used for stack turnover the pegs 83 and 89 are rotated to positions below the belts and parallel to the rods 85 and 91 respectively and out of the path of the oncoming stacks. This permits a stack to pass along the conveyor table from one end to the other without being overturned.

At the discharge end of the conveyor table 71 there may be provided any suitable stack-handling and disposal arrangement.

As shown a hydraulic lift table 93 accepts the stacks as they are discharged from the conveyor belt section. Initially such table is positioned just below the top edge of such conveyor belt section and thereafter it is lowered in stages as the stack on the table builds up. When a stack 97 on the table contains a predetermined number of sheets, a pair of horizontal arms 95 move outwardly just below the top edge of the conveyor belt section and into the path of the discharging stacks. These arms receive the stacks until the table 93 has been cleared and moved up into position, at which time the arms are withdrawn and the table takes over. If desired a pallet 99 may be placed on the table 93. The finished stack 97 contains a plurality of stacks alternatingly overturned and non-overturned.

Figure 6:
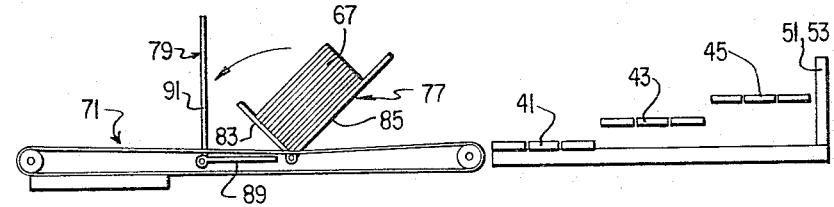
Figure 7:
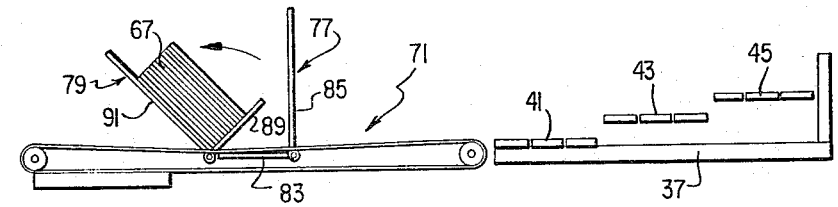
Figure 8:
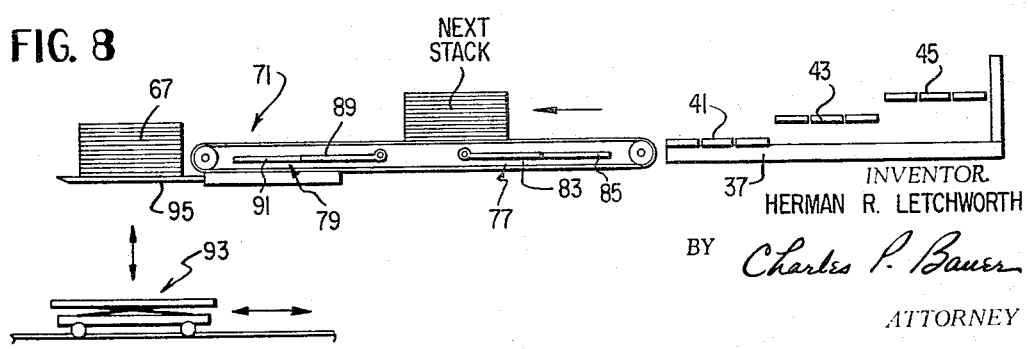

The operation of the invention to the extent not already described is as follows: As shown in FIGS. 4 and 5, the stack 67 to be overturned is carried by the conveyor belts 73 to the upstanding pegs 83. As shown in FIG. 6, the pegs 83 and rods 85 of the support member 77 are rotated 90 degrees so that the rods 85 lift the stack and rotate it so that the pegs 83 momentarily support the stack at its side. Just prior to such rotation of member 77 the pegs 89 and rods 91 of the support member 79 are rotated so that its rods 91 are upstanding. As shown in FIGS. 6 and 7, when the stack 67 is upright on its side, the support member 79 is rotated so that its pegs 89 lift the stack from the pegs 83. The stack 67, now supported by the rods 91 and pegs 89 of the support member 79, is carried to an overturned position on the conveyor table 71 and is discharged by the belts 73 onto the table 93, pallet 99 or arms 95. As shown in FIG. 8, during or after discharge of the stack 67, the pegs and rods of the support members 77 and 79 are rotated to their horizontal positions so that a next stack, indicated in legend, may be carried by the conveyor belts 73 to the table 93, pallet 99 or arms 95 without being overturned. The stacks are thus loaded on the carriage in an alternatingly overturned and non-overturned manner to prevent warping of the sheets when finally piled.

It is to be understood that the control and timing of the movements of the various elements described herein may be carried out by any suitable means, for example, by remote control, manually, or automatically, as by a programmer. Due to the improved stacking arrangement provided by the present invention, the stacking operation may be remotely controlled from a control station or by a single attendant.

It is obvious that in the conveying and stacking, as many tiers as desired may be employed. The various parts of the machine may be easily and readily adjusted to accommodate sheets of various sizes. The amount of vertical offset of the tiers may be varied in accordance with the desired stack size and the material nature of the sheets or slabs being stacked.

While one embodiment of the invention has been described and illustrated, it should be apparent to those skilled in the art that the invention permits of modification in arrangement and detail.

Since certain changes in carrying out the above process and in the construction set forth, which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for stacking sheets cut from a web of sheet material comprising: Conveying means for receiving the sheets as they are cut, said conveying means comprising a plurality of conveying parallel tiers which are in vertical offset relation, one tier for each course of sheets; a tiered stacking table located below said conveying tiers which is provided with a plurality of supports arranged in registry with and corresponding in vertical offset to said conveying tiers to form stacks of sheets on each tier of said stacking table; further conveying means located in receiving relation to said stacking table; means for pushing said tiered stacks together to form a combined stack, and for pushing said combined stack onto said further conveying means; stack overturning means located on said further conveying means for overturning predetermined combined stacks; said overturning means including first and second rotatably mounted supports, each of said supports having first and second rows of spaced radial elements mounted approximately 90 degrees apart in a shaft, said spaced elements being movable through said further conveying means; the shaft of said first support means being spaced longitudinally from the shaft of said second support means by a distance approximately equal to the height of the stack which is to be overturned, thereby permitting a predetermined height of stack to be overturned; and means for receiving said combined stacks in a pile thereof for transfer and storage.

2. Apparatus for stacking sheets cut from a web of sheet material comprising: conveying means for receiving the sheets as they are cut, said conveying means including a plurality of conveying tiers which are in vertical offset relation, one tier for each course of sheets; a tiered stacking table located below said conveying tiers which is provided with a plurality of supports arranged in registry with and in corresponding vertical offset to said conveying tiers to form stacks of sheets on each tier of said stacking table; further conveying means located in receiving relation to said stacking table; means for pushing said tiered stacks together to form a combined stack and for pushing said combined stack onto said further conveying means; stack overturning means located on said further conveying means for overturning said combined stacks; said stack overturning means including first and second rotatably mounted support means, each of said support means comprising first and second rows of spaced radial elements mounted approximately 90° apart in a shaft, said elements being movable through said further conveying means; the shaft of said first support means being longitudinally spaced from the shaft of said second support means by a distance approximately equal to the thickness of a stack to be overturned; drive means for said first and second support means; said first and second support means being movable by said drive means to positions of non-interference with stacks being carried by said further conveying means; said first support means, when occupying a position for overturning a stack, having one of its rows of radial elements upstanding and the other row extending toward an oncoming stack, whereby a stack received by said first support means may be rotatably lifted to an end in upstanding position facing said second support means; said second support means having been rotated substantially with said first support means to receive said up-ended stack in its rows of radial elements, whereby upon return rotation of said second support means said stack is delivered to said further conveying means in an overturned but intack stack.

3. Apparatus according to claim 1, wherein stopping gate means are provided on said conveying tiers to stop delivery of sheets to the stacking table when a predetermined stack height is reached on said table.

References Cited by the Examiner
UNITED STATES PATENTS

| | | | |
|---|---|---|---|
| 2,612,981 | 10/1952 | Alden | 214—6 |
| 2,981,420 | 4/1961 | Johanson | 214—6 |
| 3,142,388 | 7/1964 | Cole | 214—6 |
| 3,220,158 | 11/1965 | Roser | 214—6 |

GERALD M. FORLENZA, *Primary Examiner.*

J. E. OLDS, *Assistant Examiner.*